June 11, 1957
J. ZUERCHER
2,795,148
SELF-CENTERING ROLLER
Filed July 28, 1955
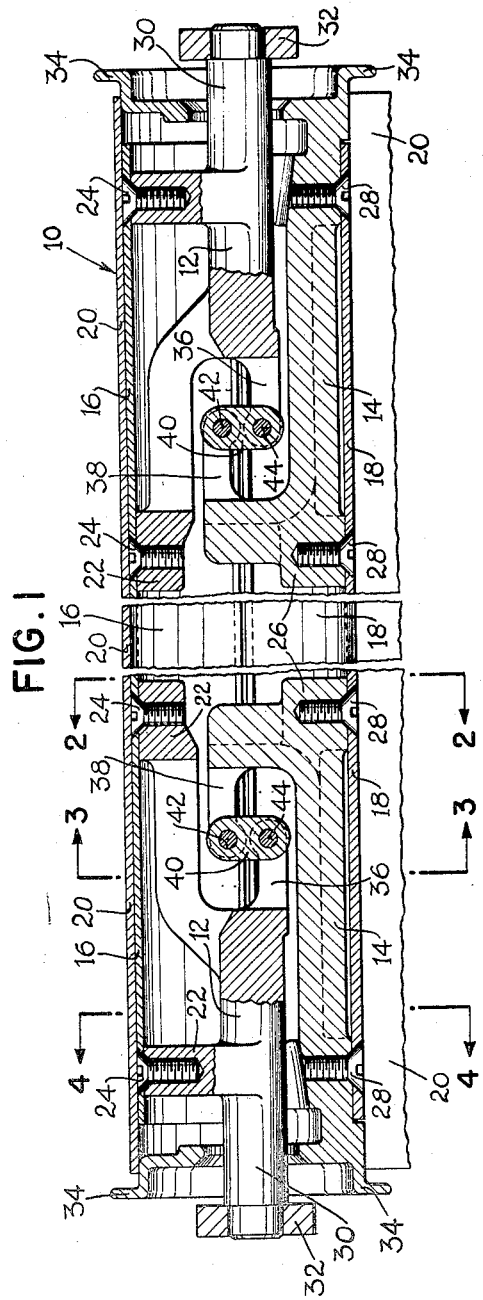
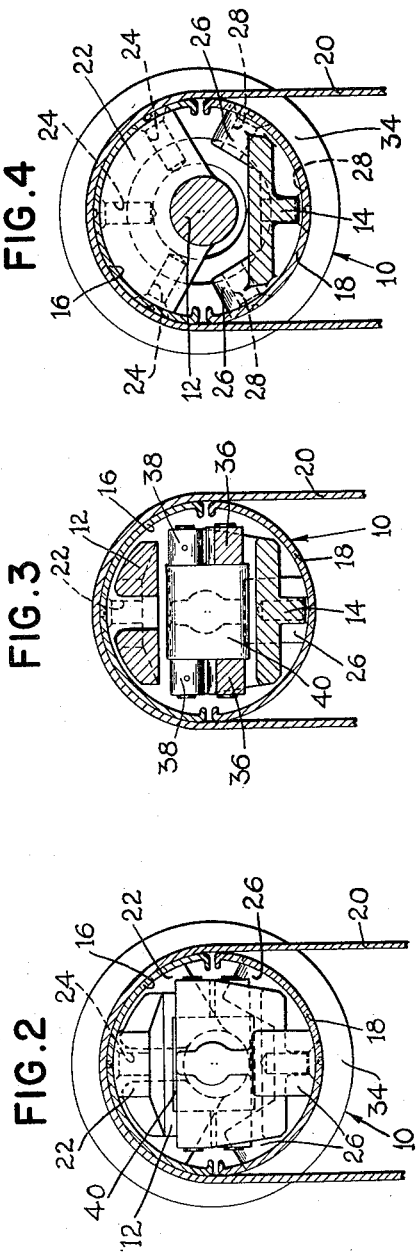
INVENTOR
JOHN ZUERCHER
BY
ATTORNEY United States Patent Office 2,795,148
Patented June 11, 1957

2,795,148

SELF-CENTERING ROLLER

John Zuercher, Mansfield, Ohio, assignor to American Machine & Foundry Company, a corporation of New Jersey Application July 28, 1955, Serial No. 524,897

6 Claims. (Cl. 74—241)

This invention relates to rotary self-centering or self-aligning devices, such as pulleys, rollers, wheels and other similar types of rotary members with which it is desired to provide self-aligning features.

The present invention takes into consideration the fact that in the operation of endless belts, such as conveyor belts, there is a tendency for the belt to move or travel from one side to the other. This movement is undesirable among other things, because it increases the wear and tear on the belt and therefore shortens its useful life.

In accordance with the invention, there is provided a simple, rugged, self-centering or self-aligning rotary structure, which for purposes of illustration, is referred to as a pulley or roller, so constructed and arranged that in operation, an endless belt passing thereover is automatically aligned, thereby solving the problem of preventing wear and tear on a belt used in conjunction with a structure made in accordance with the invention.

A device made in accordance with the invention can be used as a driving member, a driven member or an idling member. In operation, a belt may move to either side of the pulley or roller made in accordance with the invention until it comes in contact with a flange forming a part of the laterally movable hemi-cylindrical portion of the pulley or roller. As used herein, the terms pulley and roller may be considered synonymous. As soon as the edge of the belt engages the flange, the belt will cause a movement of one hemi-cylindrical part of the roller relative to the other so as to displace the means which connects the end supporting members of the roller off dead center, and centrifugal force, plus the force on the flange by the belt, move the other hemi-cylindrical portion of the pulley to the center of the belt. As soon as the roller turns 180°, the other half moves back to center and carries the belt back on the center of the other half of the pulley.

It is an object of the invention to provide a novel, self-centering, rotary structure which is simple and rugged in construction and is provided with means which co-act in response to the sidewise travel of an endless member or a belt passing thereover to automatically cause such relative movement of the parts of the structure that the belt becomes automatically centered or located in proper aligned position with respect to the rotary structure which carries it.

It is a further object of the invention to provide a novel self-centering or self-aligning rotary structure, such as an elongated pulley or roller, which is formed of a plurality of complementary arcuate members mounted for cooperation in such manner that the arcuate members can shift relative one to the other, in order that an endless belt traveling thereon and thereover is automatically shifted and aligned centrally with respect to the ends of the pulley or roller.

The invention also consists in the provision of a novel self-aligning or self-centering rotary pulley or roller which is light in weight, rugged in construction, and extremely simple to assemble.

The invention also consists in an elongated cylindrical pulley or roller formed of at least two complementary arcuate sections, the ends of which are attached to end support members, one of which is provided with a flange such that when the edge of a belt traveling on the pulley or roller engages a flange at either end of the pulley or roller, there is effected a relative shifting movement between the elongated arcuate sections and their end support members such that the belt is automatically recentered on the pulley or roller.

Other and further objects will become apparent upon a consideration of the following description of a preferred, but not necessarily the only, embodiment of the invention taken in connection with the drawings accompanying and forming a part of the specification.

In the drawings:

Fig. 1 is a sectional side elevation of a self-aligning rotary device, such as a roller, embodying a preferred form of the invention;

Fig. 2 is a sectional end elevation taken on line 2—2 of Fig. 1;

Fig. 3 is a sectional end elevation taken on line 3—3 of Fig. 1, and

Fig. 4 is a sectional end elevation taken on line 4—4 of Fig. 1.

Referring to the drawings, the rotary self-centering or self-aligning device selected for purposes of illustration is an elongated pulley or roller designated generally 10. This roller consists of two complementary hemi-cylindrical plates or parts 16 and 18. Part 16 is connected to two end supporting members 12. Part 18 is attached to two end supporting members 14. When parts 16 and 18 are secured to end members 12 and 14, respectively, as shown in Figure 1, the resulting structure is an elongated roller or pulley assembly having a cylindrical surface on which an endless member, such as belt 20, may be supported for suitable operation. Hemi-cylindrical plate or part 16 is secured by screws 24 to spaced lugs 22 which may be formed on and project radially outwardly on member 12. Hemi-cylindrical part 18 is attached by screws 28 to lugs 26 formed on end supporting members 14.

Each set of complementary end members 12 and 14 is located adjacent the ends of the assembled roller or pulley 10, the central portion thereof comprising a hollow cylindrical tubular formation which contributes to the light weight and strength of the entire assembly. Obviously, if desired, more than two lugs 22 and 26 could be provided on end members 12 and 14, and these members could be of greater length so as to extend or project further toward the center of roller 10.

In the illustrated embodiment, end supporting members 12 and 14 are castings, such as cast iron or aluminum castings. Supporting members 12 are provided with outwardly extending central axial shaft portions or trunnions 30, which function to support the entire roller or pulley 10 in suitable operating bearings 32. Supporting members 14 are provided with circular end flanges 34, preferably formed integrally therewith, or as a separate member, suitably attached thereto, adapted to function in the manner described hereinbelow. Part 16, which is attached to end supporting members 12 having trunnions 30 journalled in bearings 32, may be termed the fixed part of roller 10. Part 18, which is attached to movable end supporting members 14, may be termed the movable part of the assembly.

As shown, each end supporting member 12 is provided with an inwardly extending forked lug 36, and each end supporting member 14 is provided with an outwardly extending forked lug 38. The free ends of lugs 36 and 38 are provided with transverse aligned bores in which are fixed pins 42 and 44 extending through bores formed in the ends of links 40 connecting members 12 and 14 together. Thus it will be seen that each set of end members 12 and 14 are connected together by a link 40 for relative axial and radial movement to and from each other.

The construction shown makes possible great ease in assembling pulley or roller 10 for operation. It is only necessary to connect each set of end members 12 and 14 by a link 40 and pins 42, 44. When end members 12 and 14 are thus assembled, hemi-cylindrical plates or parts 16 and 18 are attached to their respective end members by screws 24 and 28 and pulley or roller 10 is ready for use.

In operation: In Figure 1, belt 20 is shown as running in centered position on pulley or roller 10. If there is a movement of belt 20 sideways during the rotation of pulley 10 so that an edge thereof engages one of the flanges 34, as belt 20 moves off-center relative to pulley 10, it causes hemi-cylindrical part 18 to move sideways. This in turn moves links 40 off their dead center positions shown in Figure 1, and due to centrifugal force, plus the pressure of belt 20 against flange 34 engaged thereby, hemi-cylindrical part or plate 18 is moved to the center of belt 20. Then as soon as pulley 10 turns 180°, hemi-cylindrical part 18 moves back to its centered position due to the force created by the belt tension, and relocates belt 20 on the center of fixed hemi-cylindrical part 16 of pulley 10. In this manner, the proper centering of belt 20 is always assured by the co-action between the two hemi-cylindrical parts of the self-aligning pulley or roller 10 embodying the invention. Pulley 10 may be rotated by any suitable well known driving device (not shown) or be driven by belt 20.

The invention above described may be varied in construction within the scope of the claims, for the particular device, selected to illustrate the invention, is but one of many possible concrete embodiments of the same. It is not, therefore, to be restricted to the precise details of the structure shown and described.

What I claim is:

1. A self-aligning rotary device comprising a pair of complementary hemi-cylindrical parts, said hemi-cylindrical parts being arranged to form a substantially cylindrical belt supporting surface, opposed complementary pairs of end supporting members mounting said hemi-cylindrical parts for rotation, means connecting the members of each of said pairs of members together for relative radial and axial movement, and a belt engaging flange on one of each of said pairs of end supporting members.

2. A self-centering pulley comprising two complementary substantially hemi-cylindrical plates arranged to form a substantially cylindrical belt supporting surface, an end supporting member connected to each end of one of said hemi-cylindrical parts, a trunnion formed on each of said end members and extending outwardly therefrom, a second end member connected to each end of the other of said hemi-cylindrical parts, a flange on each of said second end members, and means connecting each of said first-named members to each of said second-named members for conjoint relative radial and axial movement in centering a belt on said surface of said pulley.

3. A self-aligning pulley comprising a substantially cylindrical belt supporting body formed from at least two complementary hemi-cylindrical parts, a pair of complementary end supporting members located in each end of said body, means attaching one of said members to one of said hemi-cylindrical parts, a link connecting the members of each of said pairs of end members, means rotatably mounting one of each of said pairs of end members for rotation, a circular flange on each of said other of said end members, said flanges being operative in response to the movement of a belt sidewise on said body and the engagement of an edge of said belt with one of said flanges to move the end members with the flange and hemi-cylindrical part attached thereto in a direction opposite to the line of force applied by said belt to said flange to center said belt on said pulley.

4. A self-aligning rotary device comprising a substantially cylindrical body having a substantially cylindrical belt supporting surface, including at least two elongated complementary arcuate plates, support means for each end of said body, said means including an end supporting member having a shaft portion adapted to support said body for rotation, and means for supporting one of said elongated arcuate plates for rotation, said first-named means also including a complementary movable end supporting member for supporting said other of said arcuate members for rotation and conjoint axial and radial movement relative to said first-named arcuate plate, link means connecting said first-named and said second-named end supporting members, and circular flanges on said second-named end supporting members whereby when during the rotation of said pulley an edge of said belt engages one of said flanges, said movable end supporting members and said arcuate plate attached thereto being moved to center said belt on said pulley.

5. A self-centering pulley for supporting an endless belt comprising a relatively fixed hemi-cylindrical member and a complementary laterally movable hemi-cylindrical member, end supports attached to each end of said relatively fixed member, each of said end supports having means mounting said pulley for rotation, end supports attached to the ends of said laterally movable hemi-cylindrical member, means interconnecting said end supports for relative radial and lateral movement, and means operative in response to the engagement of an edge of said belt therewith during the rotation of said pulley for moving said end supports relative to each other and said laterally movable hemi-cylindrical member relative to said relatively fixed hemi-cylindrical member to center said belt on said pulley.

6. A self-aligning pulley adapted to support an endless belt comprising a plurality of hemi-cylindrical complementary members arranged to form a substantially cylindrical belt supporting surface, end supports connected to one of said members provided with shaft means mounting said member for rotation, complementary end supports connected to said other of said hemi-cylindrical members, floating means connecting said end supports and thereby mounting said last-named hemi-cylindrical member for rotation with said first-named hemi-cylindrical member and for lateral movement relative thereto, and a flange element on each of said last-named end supports, said flange elements being operative in response to the engagement of an edge of a belt therewith during the rotation of said pulley to shift said hemi-cylindrical members relative to each other and thereby center said belt on said pulley.

References Cited in the file of this patent

UNITED STATES PATENTS

| | | |
|---|---|---|
| 2,301,545 | Hlavaty | Nov. 10, 1942 |
| 2,334,768 | Hlavaty | Nov. 23, 1943 |
| 2,340,750 | Hlavaty | Feb. 1, 1944 |